(12) United States Patent
Xu et al.

(10) Patent No.: US 11,837,993 B2
(45) Date of Patent: Dec. 5, 2023

(54) SYSTEM FOR CONTROLLING A PHOTOVOLTAIC SYSTEM, METHOD AND DEVICE FOR CONTROLLING THE PHOTOVOLTAIC SYSTEM

(71) Applicant: Gree Electric Appliances, Inc. of Zhuhai, Guangdong (CN)

(72) Inventors: Hongwei Xu, Guangdong (CN); Guangzhi Qin, Guangdong (CN); Kai Zhu, Guangdong (CN); Zuoxin Jiang, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 414 days.

(21) Appl. No.: 17/260,100

(22) PCT Filed: Dec. 11, 2018

(86) PCT No.: PCT/CN2018/120361
§ 371 (c)(1),
(2) Date: Jan. 13, 2021

(87) PCT Pub. No.: WO2020/024507
PCT Pub. Date: Feb. 6, 2020

(65) Prior Publication Data
US 2021/0273608 A1    Sep. 2, 2021

(30) Foreign Application Priority Data

Aug. 1, 2018   (CN) .......................... 201810866700.7

(51) Int. Cl.
*H02S 50/00*        (2014.01)
*H02J 13/00*        (2006.01)
(Continued)

(52) U.S. Cl.
CPC ............ *H02S 50/00* (2013.01); *G08B 21/185* (2013.01); *H02J 1/10* (2013.01); *H02J 13/00026* (2020.01);
(Continued)

(58) Field of Classification Search
CPC ....... H02S 50/00; G08B 21/185; G08B 25/08; H02J 1/10; H02J 13/00026; H02J 2300/24;
(Continued)

(56) References Cited

U.S. PATENT DOCUMENTS 5,878,584 A      3/1999  Sasaki et al.
2012/0316802 A1* 12/2012 Presher, Jr. ............. H02J 3/381
                                                       702/58
(Continued)

FOREIGN PATENT DOCUMENTS

CN    101794142 A    8/2010
CN    201656821 U   11/2010
(Continued)

OTHER PUBLICATIONS

International Search Report issued in connection with PCT Application No. PCT/CN2018/120361 dated Apr. 29, 2019.

*Primary Examiner* — Giovanni Astacio-Oquendo
(74) *Attorney, Agent, or Firm* — Dennemeyer & Associates LLC; Victoria Friedman

(57) ABSTRACT

A system for controlling a photovoltaic system and a method and device for controlling a photovoltaic system are provided. The method includes that: whether an abnormity occurs to a control component which currently controls the photovoltaic system or not is determined; and under the condition of determining that the abnormity occurs, switching to another control component to control the photovoltaic system is executed. According to the disclosure, the tech- (Continued)

nical problem of relatively low reliability of a control system for a photovoltaic system providing power for a smart home system in the related art is solved.

20 Claims, 1 Drawing Sheet

(51) Int. Cl.
*G08B 21/18* (2006.01)
*H02J 1/10* (2006.01)
(52) U.S. Cl.
CPC ....... *H02J 2300/24* (2020.01); *H02J 2310/14* (2020.01)
(58) Field of Classification Search
CPC .......... H02J 2310/14; H02J 3/381; H02J 7/35; Y02B 10/10; Y02E 10/56; G05B 23/0259
USPC .......................................... 324/512, 511, 500
See application file for complete search history.

(56) References Cited

U.S. PATENT DOCUMENTS

| 2018/0090939 | A1* | 3/2018 | Pal | .......................... F25B 49/00 |
| 2022/0352722 | A1* | 11/2022 | Narla | ........................ H02J 3/32 |

FOREIGN PATENT DOCUMENTS

| CN | 102308469 A | 1/2012 |
| CN | 102684297 A | 9/2012 |
| CN | 103178541 A | 6/2013 |
| CN | 103425113 A | 12/2013 |
| CN | 204256398 U | 4/2015 |
| CN | 204652031 U | 9/2015 |
| CN | 107577141 A | 1/2018 |
| CN | 207406418 U | 5/2018 |
| CN | 207603265 U | 7/2018 |
| CN | 108931973 A | 12/2018 |
| JP | 2016024798 A | 2/2016 |
| WO | 2017164844 A1 | 9/2017 |

* cited by examiner

SYSTEM FOR CONTROLLING A PHOTOVOLTAIC SYSTEM, METHOD AND DEVICE FOR CONTROLLING THE PHOTOVOLTAIC SYSTEM

CROSS-REFERENCE TO RELATED APPLICATIONS

The present application claims priority to Chinese Patent Application No. 201810866700.7, submitted to the National Intellectual Property Administration, PRC on Aug. 1, 2018, and entitled "System for Controlling a Photovoltaic System, Method and Device for Controlling the Photovoltaic System", the disclosure of which is hereby incorporated by reference in its entirety.

TECHNICAL FIELD

The disclosure relates to the technical field of power consumption management of home devices, and particularly to a system for controlling a photovoltaic system and a control method device for the system for controlling a photovoltaic system.

BACKGROUND

At present, smart home systems bring great conveniences to people's lives, and may connect various electric equipment, for example, various electric equipment like air conditioners, televisions and lighting electric equipment, in homes through an Internet of things technology for intelligent control. However, a photovoltaic system providing power for a smart home system is not managed more reliably, and when a control board of the photovoltaic system is damaged, the whole photovoltaic system may be paralyzed and may not operate to provide power for the smart home system, further influencing normal operation of each piece of electric equipment in the smart home system, also influencing the normal life of a user, brings great inconveniences to the life of the user and reducing user experiences.

For the problem of relatively low reliability of a control system for a photovoltaic system providing power for a smart home system in the related art, there is yet no effective solution at present.

SUMMARY

According to an aspect of the embodiments of the disclosure, a system for controlling a photovoltaic system is provided, which includes: a first controlling component, connected with the photovoltaic system and configured to control an operation of the photovoltaic system, the photovoltaic system comprises a photovoltaic power generation device and a battery system and the photovoltaic system is configured to provide power for electric equipment; a second controlling component, connected with the photovoltaic system and configured to control the operation of the photovoltaic system, the first controlling component and the second controlling component have a same control function for the photovoltaic system; and a processing component, connected with the first controlling component and the second controlling component and configured to, after an abnormity occurs to a control component which currently controls the photovoltaic system, switch to a control component which no abnormity occurs to.

Optionally, the system further includes a third controlling component, connected with the photovoltaic system and the processing component and configured to control the operation of the photovoltaic system, and the third controlling component has part or all of the control function of the first controlling component and the second controlling component.

Optionally, under a condition that the electric equipment includes a wireless network component, a function of the third controlling component is realized by the wireless network component.

Optionally, the electric equipment includes a direct current air conditioner.

Optionally, a function of the first controlling component is realized by a control board of the photovoltaic system.

Optionally, a function of the second controlling component is realized by a network device connected with the photovoltaic system.

Optionally, the network device includes a router.

According to another aspect of the embodiments of the disclosure, a method for controlling a photovoltaic system is also provided, which is applied to any abovementioned system and includes determining whether an abnormity occurs to a control component which currently controls the photovoltaic system or not; and under a condition that it is determined that the abnormity occurs, switching to another control component to control the photovoltaic system.

According to another aspect of the embodiments of the disclosure, a device for controlling a photovoltaic system is also provided, which is applied to any abovementioned system and includes: a determining element, configured to determine whether an abnormity occurs to a control component which currently controls the photovoltaic system or not; and a switching element, configured to, under a condition that it is determined that the abnormity occurs, switch to another control component to control the photovoltaic system.

According to another aspect of the embodiments of the disclosure, a non-transitory storage medium is also provided, which includes a stored program, the program executing the control method for the system for controlling a photovoltaic system.

According to another aspect of the embodiments of the disclosure, a processor is also provided, wherein the processor is configured to run a program, when being run, the program executes the method for controlling the photovoltaic system.

In the embodiments of the disclosure, the photovoltaic system is controlled in a manner of determining whether the abnormity occurs to the control component which currently controls the photovoltaic system or not; and, under a condition that it is determined that the abnormity occurs, switching to another control component to control the photovoltaic system. Through the method for controlling a photovoltaic system in the embodiments of the disclosure, a purpose of controlling, through multiple control components, the photovoltaic system providing power for a smart home system may be achieved, a technical effect of improving the reliability of the photovoltaic system to further improve the reliability of the smart home system and provide an easy home life for a user is achieved, the technical problem of relatively low reliability of a control system for a photovoltaic system providing power for a smart home system in the related art is further solved, and user experiences are improved.

BRIEF DESCRIPTION OF THE DRAWINGS

The drawings described here are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION OF THE EMBODIMENTS

In order to make those skilled in the art understand the solutions of the disclosure better, the technical solutions in the embodiments of the disclosure will be clearly and completely described below in combination with the drawings in the embodiments of the disclosure. It is apparent that the described embodiments are not all embodiments but only a part of the embodiments of the disclosure. All other embodiments obtained by those of ordinary skill in the art based on the embodiments in the disclosure without creative work shall fall within the scope of protection of the disclosure.

It is to be noted that the terms like "first" and "second" in the specification, claims and accompanying drawings of the disclosure are used for differentiating the similar objects, but do not have to describe a specific order or a sequence. It is to be understood that data used like this may be exchanged under a proper condition for implementation of the embodiments of the disclosure described here in sequences besides those shown or described herein. In addition, terms "include" and "have" and any transformation thereof are intended to cover nonexclusive inclusions. For example, a process, method, system, product or device including a series of steps or units is not limited to those clearly listed steps or units, but may include other steps or units which are not clearly listed or inherent in the process, the method, the system, the product or the device.

For convenient description, part of nouns or terms in the embodiments of the disclosure will be described below in detail.

Photovoltaic: it, as an abbreviation of a solar photovoltaic power generation system, is a novel power generation system directly converting solar radiant energy into power by use of a photovoltaic effect of a solar cell semiconductor material, and has independent operation and grid-connected operation modes.

Wireless network: it is a network implemented by a wireless communication technology, not only includes a global voice and data network allowing users to establish remote wireless connections but also includes an infrared technology and radio frequency technology optimizing short-distance wireless connections. It is quite similar to a wired network in purpose, and the greatest difference is that transmission media are different. A radio technology is adopted instead of a network, and mutual backup with the wired network may be implemented.

Embodiment 1

Figure 1:
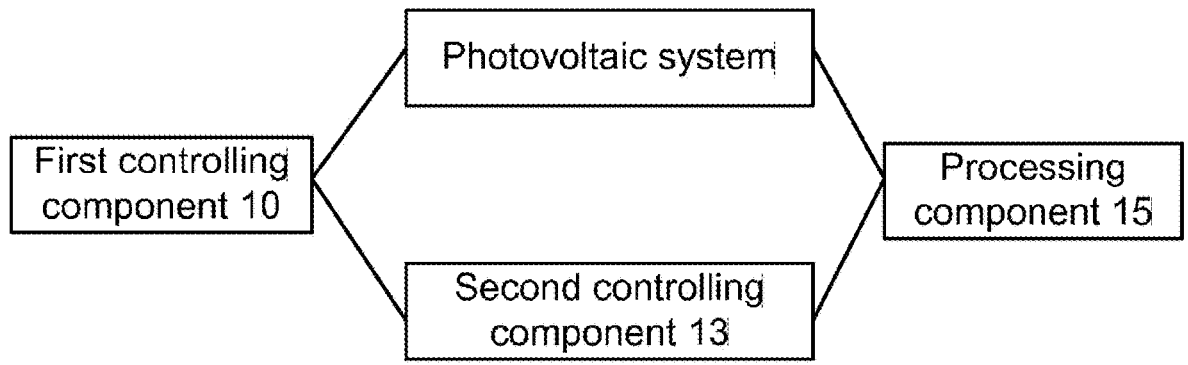
FIG. 1 illustrates a schematic diagram of a system for controlling a photovoltaic system according to an embodiment of the disclosure.

According to an aspect of the embodiments of the disclosure, system for controlling a photovoltaic system is provided. FIG. 1 is a schematic diagram of a system for controlling a photovoltaic system according to an embodiment of the disclosure. As shown in FIG. 1, the system for controlling a photovoltaic system includes a photovoltaic system 10, a first controlling component 11, a second controlling component 13 and a processing component 15. The system for controlling a photovoltaic system will be described below in detail.

The first controlling component 11 is connected with the photovoltaic system 10, and is configured to control an operation of the photovoltaic system. The photovoltaic system includes a photovoltaic power generation device and a battery system, and the photovoltaic system is configured to provide power for electric equipment.

Specifically, the battery system may be an energy storage accumulator. The energy storage accumulator is an accumulator for energy storage of a solar power plant, wind power generation equipment and renewable energy.

In the embodiment of the disclosure, the battery system in the photovoltaic system may be configured to store power generated by the photovoltaic power generation device. Herein, the power generated by the photovoltaic power generation device in the photovoltaic system is mainly adopted to power each piece of electric equipment in a smart home system.

The second controlling component 13 is connected with the photovoltaic system 10, and is configured to control the operation of the photovoltaic system. The first controlling component and the second controlling component have a same control function for the photovoltaic system.

The processing component 15 is connected with the first controlling component 11 and the second control system 13, and is configured to, after an abnormity occurs to a control component which currently controlling the photovoltaic system, switch to a control component that no abnormity occurs to.

In the embodiment of the disclosure, the operation of the photovoltaic system may be controlled by use of the first controlling component connected with the photovoltaic system, the photovoltaic system including the photovoltaic power generation device and the battery system and the photovoltaic system being configured to provide power for the electric equipment; the operation of the photovoltaic system may also be controlled by use of the second controlling component connected with the photovoltaic system, the first controlling component and the second controlling component having the same control function for the photovoltaic system; and after the abnormity occurs to the control component which currently controls the photovoltaic system, switching to the control component that no abnormity occurs to is executed by use of the processing component connected with the first controlling component and the second controlling component. Compared with the related art with such a shortcoming that there is only one control component configured to control the photovoltaic system and, when the control component fails, the photovoltaic system may not provide power for the electric equipment in the smart home system, the smart home system is not powered and thus paralyzed and the normal life of a user is further influenced, the system for controlling a photovoltaic system provided in the embodiment of the disclosure has the advantages that a purpose of controlling, through multiple control components, the photovoltaic system providing power for the smart home system may be achieved, a technical effect of improving the reliability of the photovoltaic system to further improve the reliability of the smart home system and provide an easy home life for the user is achieved, the technical problem of relatively low reliability of a control system for a photovoltaic system providing power for a smart home system in the related art is further solved, and user experiences are improved.

As an optional embodiment of the disclosure, the system for controlling a photovoltaic system may further include a third controlling component, connected with the photovoltaic system and the processing component and configured to control the operation of the photovoltaic system, and the third controlling component has part or all of the control function of the first controlling component and the second controlling component. For example, under the condition that the first controlling component and the second controlling component may not control the photovoltaic system, the photovoltaic system may be controlled by use of the third controlling component, to improve the reliability of the system for controlling a photovoltaic system.

As an optional embodiment of the disclosure, under a condition that the electric equipment includes a wireless network component, a function of the third controlling component is realized by the wireless network component. For example, the wireless network component in the electric equipment in the smart home system in the home of the user may be used as the third controlling component. The wireless network component may include, but not limited to, a Wireless Fidelity (WiFi) module. For example, under the condition that the first controlling component and the second controlling component may not control the photovoltaic system, a WiFi module in an air conditioner may take over a control board of the photovoltaic system to implement control over the photovoltaic system.

The electric equipment may include a direct current air conditioner.

As an optional embodiment of the disclosure, a function of the first controlling component is realized by the control board of the photovoltaic system. That is, the control board of the photovoltaic system may serve as a control center, and the photovoltaic system is controlled by the control board.

As an optional embodiment of the disclosure, a function of the second controlling component is realized by a network device connected with the photovoltaic system.

Since a server and a mobile phone of the user are relatively unstable, while a router may always be fixed at a certain position in the home of the user and is relatively stable. Therefore, the network device may preferably include the router.

As an optional embodiment of the disclosure, the system for controlling a photovoltaic system may further include an alarming component. The processor may periodically send heartbeat signals to the first controlling component, the second controlling component or the third controlling component, the heartbeat signal being configured to detect whether an abnormity occurs to the first controlling component, the second controlling component or the third controlling component or not. Specifically, the first controlling component, the second controlling component or the third controlling component, after receiving the heartbeat signal sent by the processor, may send a feedback signal to the processor, and the processor, under a condition of not receiving the feedback signal of the first controlling component, the second controlling component or the third controlling component, may determine that the abnormity occurs to the first controlling component, the second controlling component or the third controlling component.

In addition, the processor may further generate alarming information according to information, recorded by itself, of the control component that an abnormity occurs to and send the alarming information to the alarming component, and the alarming component may alarm according to the alarming information to prompt the user that the control component that the abnormity occurs to exist. The alarming information contains identification information of the control component that the abnormity occurs to. Of course, the processor may also directly push the alarming information to the related user to prompt the user to maintain the control component that the abnormity occurs to, thereby ensuring normal operation of the photovoltaic system.

Embodiment 2

According to the embodiment of the disclosure, a method embodiment of method for controlling a photovoltaic system is provided, which is applied to any abovementioned system for controlling a photovoltaic system. It is to be noted that the steps presented in the flowchart of the drawings can be executed in a computer system like a set of computer executable instructions and, moreover, although a logical sequence is shown in the flowchart, in some cases, the presented or described steps can be executed in a sequence different from that described here.

Figure 2:
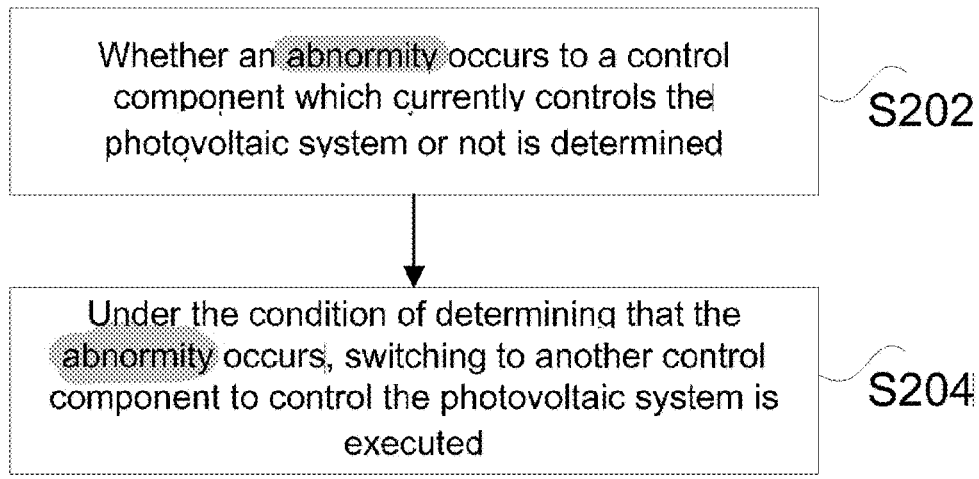
FIG. 2 illustrates a flowchart of a method for controlling a photovoltaic system according to an embodiment of the disclosure.

FIG. 2 is a flowchart of a method for controlling a photovoltaic system according to an embodiment of the disclosure. As shown in FIG. 2, the method for controlling a photovoltaic system includes the following steps.

In S202, whether an abnormity occurs to a control component which currently controls the photovoltaic system or not is determined.

The operation that whether the abnormity occurs to the control component which currently controlling the photovoltaic system or not is determined may include that: a heartbeat signal is periodically sent to the control component, the heartbeat signal being configured to detect whether the abnormity occurs to the control component or not; under a condition that a feedback signal returned by the control component may be normally received, it is determined that no abnormity occurs to the control component; and under a condition that no feedback signal returned by the control component is not received for a continuous predetermined number of times, it is determined that the abnormity occurs to the control component.

In S204, under a condition that it is determined that the abnormity occurs, switching to another control component to control the photovoltaic system is executed.

Through the steps above, whether the abnormity occurs to the control component currently controlling the photovoltaic system or not may be determined, and under the condition of determining that the abnormity occurs, switching to the other control component to control the photovoltaic system is executed. Compared with the related art with such a shortcoming that there is only one control component configured to control the photovoltaic system and, when the control component fails, the photovoltaic system may not provide power for the electric equipment in the smart home system, the smart home system is not powered and thus paralyzed and the normal life of a user is further influenced, the control method for the system for controlling a photovoltaic system in the embodiment of the disclosure has the advantages that a purpose of controlling, through multiple control components, the photovoltaic system providing power for the smart home system may be achieved, a technical effect of improving the reliability of the photovoltaic system to further improve the reliability of the smart home system and provide an easy home life for the user is achieved, the technical problem of relatively low reliability of a control system for a photovoltaic system providing power for a smart home system in the related art is further solved, and user experiences are improved.

As an optional embodiment of the disclosure, the operation in S204 that switching to the other control component to control the photovoltaic system is executed under the condition of determining that the abnormity occurs may include that: priorities of control components that no abnormity occurs to is acquired; and the control component capable of normally controlling the photovoltaic system is determined according to the acquired priorities of the control components. The operation that the control component capable of normally controlling the photovoltaic system is determined according to the acquired priorities of the control components may include that: the control component with the highest priority is selected as a control component to control the photovoltaic system.

Embodiment 3

According to the embodiment of the disclosure, a device for controlling a photovoltaic control system is also provided, which is applied to the system as mentioned above. It is to be noted that the device for controlling a photovoltaic control system in the embodiment of the disclosure may be configured to execute the method for controlling a photovoltaic system in the embodiments of the disclosure. The device for controlling a photovoltaic control system in the embodiment of the disclosure will be introduced below.

Figure 3:
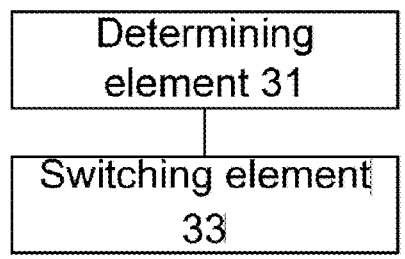
FIG. 3 illustrates a schematic diagram of a device for controlling a system for controlling a photovoltaic system according to an embodiment of the disclosure.

FIG. 3 is a schematic diagram of a device for controlling a photovoltaic control system according to an embodiment of the disclosure. As shown in FIG. 4, the device for controlling a photovoltaic control system includes a determining element 31 and a switching element 33. The device for controlling a photovoltaic control system will be described below in detail.

The determining element 31 is configured to determine whether an abnormity occurs to a control component which currently controls the photovoltaic system or not.

The switching unit 33 is connected with the determination unit 31, and is configured to, under a condition that it is determined that the abnormity occurs, switch to another control component to control the photovoltaic system.

In the embodiment, whether the abnormity occurs to the control component which currently controls the photovoltaic system or not may be determined by use of the determining element, and meanwhile, under the condition of determining that the abnormity occurs, switching to the other control component to control the photovoltaic system is executed by use of the switching unit. Compared with the related art with such a shortcoming that there is only one control component configured to control the photovoltaic system and, when the control component fails, the photovoltaic system may not provide power for the electric equipment in the smart home system, the smart home system is not powered and thus paralyzed and the normal life of a user is further influenced, the control device for the system for controlling a photovoltaic system in the embodiment of the disclosure has the advantages that a purpose of controlling, through multiple control components, the photovoltaic system providing power for the smart home system may be achieved, a technical effect of improving the reliability of the photovoltaic system to further improve the reliability of the smart home system and provide an easy home life for the user is achieved, the technical problem of relatively low reliability of a control system for a photovoltaic system providing power for a smart home system in the related art is further solved, and user experiences are improved.

The device for controlling a photovoltaic control system may include a processor and a memory. The determining element 31, the switching element 33 and the like are stored in the memory as program units, and the processor executes the program units stored in the memory to realize corresponding functions.

The processor includes a core, and the core calls the corresponding program unit in the memory. There may be arranged one or more cores, and a core parameter is regulated to execute switching to the other control component to control the photovoltaic system under the condition of determining that the abnormity occurs.

The memory may include forms such as a nonvolatile memory, Random Access Memory (RAM) and/or nonvolatile memory in a storage medium, for example, a Read-Only Memory (ROM) or a flash RAM, and the memory includes at least one storage chip.

According to another aspect of the embodiments of the disclosure, a non-transitory storage medium is also provided, which includes a stored program, the program executing the method for controlling a photovoltaic system.

According to another aspect of the embodiments of the disclosure, a processor is also provided, which is configured to run a program, the program running to execute the method for controlling a photovoltaic system.

The embodiments of the disclosure also provide electric equipment, which includes a processor, a memory and a program stored in the memory and capable of running in the processor. The processor executes the program to implement the following steps: whether an abnormity occurs to a control component which currently controls the photovoltaic system or not is determined; and under the condition of determining that the abnormity occurs, switching to another control component to control the photovoltaic system is executed.

The embodiments of the disclosure also provide a computer program product. During execution in data processing electric equipment, a program initialized with the following method steps is suitable to be executed: whether an abnormity occurs to a control component which currently controls the photovoltaic system or not is determined; and under the condition of determining that the abnormity occurs, switching to another control component to control the photovoltaic system is executed.

The sequence numbers of the embodiments of the disclosure are only adopted for description and do not represent superiority-inferiority of the embodiments.

In the embodiments of the disclosure, the descriptions of the embodiments focus on different aspects. The part which is not described in a certain embodiment in detail may refer to the related description of the other embodiments.

In some embodiments provided in the application, it is to be understood that the disclosed technical contents may be implemented in other manners. Herein, the device embodiment described above is only schematic. For example, division of the units is only division of logical functions, and other division manners may be adopted during practical implementation. For example, multiple units or components may be combined or integrated to another system, or some features may be ignored or are not executed. In addition, shown or discussed coupling, direct coupling or communication connection may be implemented through indirect coupling or communication connection of some interfaces, units or modules, and may be in an electrical form or other forms.

The units described as separate parts may or may not be separate physically, and parts displayed as units may or may not be physical units, that is, they may be located in the same place, or may also be distributed to multiple units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

If being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a ROM, a RAM, a mobile hard disk, a magnetic disk or an optical disk.

The above is only the preferred embodiment of the disclosure. It is to be pointed out that those of ordinary skill in the art may also make a number of improvements and embellishments without departing from the principle of the disclosure and these improvements and embellishments shall also fall within the scope of protection of the disclosure.

What is claimed is:

1. A system for controlling a photovoltaic system, comprising:
   a first controlling component, connected with the photovoltaic system and configured to control an operation of the photovoltaic system, wherein the photovoltaic system comprises a photovoltaic power generation device and a battery system, the photovoltaic system is configured to provide power for electric equipment;
   a second controlling component, connected with the photovoltaic system and configured to control the operation of the photovoltaic system, wherein the first controlling component and the second controlling component have a same control function for the photovoltaic system; and
   a processing component, connected with the first controlling component and the second controlling component and configured to, after an abnormity occurs to a control component which currently controls the photovoltaic system, switch to a control component which no abnormity occurs to.

2. The system as claimed in claim 1, further comprising:
   a third controlling component, connected with the photovoltaic system and the processing component and configured to control the operation of the photovoltaic system, wherein the third controlling component has part or all of the control function of the first controlling component and the second controlling component.

3. The system as claimed in claim 2, wherein, under a condition that the electric equipment comprises a wireless network component, a function of the third controlling component is realized by the wireless network component.

4. The system as claimed in claim 3, wherein the electric equipment comprises a direct current air conditioner.

5. The system as claimed in claim 3, wherein the function of the first control component is realized by a control board of the photovoltaic system.

6. The system as claimed in claim 3, wherein the function of the second control component is realized by a network device connected with the photovoltaic system.

7. The system as claimed in claim 2, wherein the electric equipment comprises a direct current air conditioner.

8. The system as claimed in claim 2, wherein the function of the first control component is realized by a control board of the photovoltaic system.

9. The system as claimed in claim 2, wherein the function of the second control component is realized by a network device connected with the photovoltaic system.

10. The system as claimed in claim 2, wherein the system further comprising: an alarming component, configured to alarm according to an alarming information.

11. The system as claimed in claim 10, wherein the alarming information is generated by a processor, wherein the processor generate the alarming information according to information which is recorded by itself.

12. The system as claimed in claim 10, wherein the alarming information records identification information of the control component that the abnormity occurs to.

13. The system as claimed in claim 1, wherein the electric equipment comprises a direct current air conditioner.

14. The system as claimed in claim 1, wherein a function of the first controlling component is realized by a control board of the photovoltaic system.

15. The system as claimed in claim 1, wherein the function of the second controlling component is realized by a network device connected with the photovoltaic system.

16. The system as claimed in claim 15, wherein the network device comprises a router.

17. A method for controlling a photovoltaic system, applied to the system as claimed in claim 1 and the method comprising:
   determining whether an abnormity occurs to a control component which currently controls the photovoltaic system or not; and
   under a condition that it is determined that the abnormity occurs, switching to another control component to control the photovoltaic system.

18. A non-transitory storage medium, wherein the non-transitory storage medium comprises a computer program, when being run, the program executes the method for controlling the photovoltaic system as claimed in claim 17.

19. A processor, wherein the processor is configured to run a program, when being run, the program executes the method for controlling the photovoltaic system as claimed in claim 17.

20. A device for controlling a system for controlling a photovoltaic system, applied to the system claimed in claim 1, the device comprising:
   a determining element, configured to determine whether an abnormity occurs to a control component which currently controls the photovoltaic system or not; and
   a switching element, configured to, under a condition that it is determined that the abnormity occurs, switch to another control component to control the photovoltaic system.

* * * * *